(12) United States Patent
Graesser et al.

(10) Patent No.: US 12,736,343 B2
(45) Date of Patent: Sep. 15, 2026

(54) SURVEYING TARGET AND METHOD WITH DISTANCE POWER OPTIMIZATION

(71) Applicant: Trimble Inc., Westminster, CO (US)

(72) Inventors: Christian Graesser, Danderyd (SE); Jacques Rondeau, Carquefou (FR)

(73) Assignee: Trimble Inc., Westminster, CO (US)

( * ) Notice: Subject to any disclaimer, the term of this patent is extended or adjusted under 35 U.S.C. 154(b) by 433 days.

(21) Appl. No.: 18/444,389

(22) Filed: Feb. 16, 2024

(65) Prior Publication Data

US 2024/0302167 A1 Sep. 12, 2024

(30) Foreign Application Priority Data

Mar. 10, 2023 (EP) .................................... 23161287

(51) Int. Cl.
*G01C 15/00* (2006.01)

(52) U.S. Cl.
CPC ......... *G01C 15/004* (2013.01); *G01C 15/006* (2013.01)

(58) Field of Classification Search
CPC .... G01C 15/004; G01C 15/006; G01C 15/06; G01C 15/002
See application file for complete search history.

(56) References Cited

U.S. PATENT DOCUMENTS 4,029,415 A * 6/1977 Johnson ................. G01C 15/06 33/294
4,820,041 A * 4/1989 Davidson ................. G01S 5/16 33/294
5,467,290 A * 11/1995 Darland ................. G01C 15/00 324/323
5,551,159 A * 9/1996 Mooty ................. G01C 15/002 33/294
5,666,792 A * 9/1997 Mullins ................ A01B 69/008 56/DIG. 15
5,671,160 A * 9/1997 Julian .................... G01C 15/00 702/94

(Continued)

FOREIGN PATENT DOCUMENTS

| | | | |
|---|---|---|---|
| EP | 2 226 610 | A1 | 9/2010 |
| WO | 2008/145156 | A1 | 12/2008 |

OTHER PUBLICATIONS

Trimble (doc. "Trimble S9 HP total station User Guide" (Year: 2015).*

(Continued)

*Primary Examiner* — Assres H Woldemaryam
(74) *Attorney, Agent, or Firm* — Kilpatrick Townsend & Stockton LLP

(57) ABSTRACT

A target for use in surveying applications is provided. The target comprises a plurality of light sources arranged around a longitudinal axis (A) of a base element of the target. The plurality of light sources is configured to emit light radially. The target further comprises a control unit. The control unit is configured to receive, from a surveying instrument aimed towards the target, an input indicative of a distance (d) between the target and the surveying instrument. The control unit is further configured to control an intensity of the light emitted by the plurality of light sources based on the input indicative of the distance between the target and the surveying instrument.

13 Claims, 2 Drawing Sheets

(56) References Cited

U.S. PATENT DOCUMENTS 6,023,326 A * 2/2000 Katayama ............ G01C 15/002 33/290
7,456,943 B1 * 11/2008 Goad ................... G01C 15/002 356/3.01
7,739,803 B2 * 6/2010 Yahagi .................... G01S 17/66 33/290
7,804,051 B2 * 9/2010 Hingerling ........... G01C 15/002 250/206.1
7,913,405 B2 * 3/2011 Berg ...................... G01C 15/06 33/228
8,567,076 B2 * 10/2013 Ortleb .................... G01C 15/06 33/228
8,712,721 B2 * 4/2014 Hamel ................... G01C 15/02 33/291
8,826,553 B2 * 9/2014 Kahle ...................... G01C 5/02 33/290
10,145,671 B2 * 12/2018 Khatuntsev .......... G01C 15/006
10,605,600 B2 * 3/2020 Nishita ................... G01S 17/66
10,742,969 B1 * 8/2020 Rohatgi ............... H04N 17/002
2001/0019101 A1 * 9/2001 Ohtomo ................. G01C 15/06 250/206.1
2004/0233415 A1 * 11/2004 Nakamura ........... G01C 15/002 356/4.01
2010/0212169 A1 * 8/2010 Fleenor .................. G01C 15/08 33/228
2012/0124850 A1 * 5/2012 Ortleb .................... G01C 15/06 33/228
2014/0081571 A1 * 3/2014 Briggs ................... G01C 15/00 701/523
2020/0408501 A1 * 12/2020 Hull ....................... G01B 5/012
2021/0303898 A1 * 9/2021 Wang ..................... G06V 20/10
2021/0372768 A1 * 12/2021 Müller ................. G01B 11/002
2022/0074764 A1 * 3/2022 Müller ...................... G06T 7/80

OTHER PUBLICATIONS

Trimble (doc. “Trimble multitrack Target Quick Start Guide”) (Year: 2016).*
Extended European Search Report for Application No. 23161287.0-1009, mailed Nov. 7, 2023, 11 pages.
International Search Report and Written Opinion for Application No. PCT/EP2024/056213, mailed May 29, 2024, 12 pages.

* cited by examiner 10
10
10
120
124
122
A
102
126
104
106
108
110
100
128
d
112

A
102
100
104
218
106
108
214
216

SURVEYING TARGET AND METHOD WITH DISTANCE POWER OPTIMIZATION

CROSS-REFERENCE TO RELATED APPLICATIONS

This application claims priority to European Patent Application No. 23161287.0, filed Mar. 10, 2023, the entire contents of which are incorporated herein by reference for all purposes.

TECHNICAL FIELD

The present disclosure relates generally to the field of surveying equipment. More specifically, it relates to optimizing LED power consumption in a target for use in surveying applications.

BACKGROUND

The art of surveying involves the determination of unknown positions or setting out of known coordinates using angle and distance measurements taken from one or more positions. In surveying operations, a surveying device or instrument is often used to determine one or more positions of a target. An example of such a surveying instrument is a total station, which is a distance measuring instrument with an integrated distance and angular measurement, i.e. with combined electronic, optical and computer techniques. A total station is furthermore provided with a computer or control unit with writable information for measurements to be performed and for storing data obtained during the measurements. Preferably, the surveying instrument, calculates the position of a target in a fixed ground-based coordinate system.

The target may emit light detectable by the surveying instrument. The surveying instrument may be configured to identify and track the target based on light emitted by the target.

SUMMARY

One general aim of the present disclosure is to optimize power consumption by the target, to increase battery time and improve autonomy of the target. Specifically, there is a desire to be able to improve the control of light sources of the target.

It is therefore an object of the present invention to meet at least some of the above-mentioned goals, and to provide an improved target for surveying operations and a method for operating the target.

This and other objects are achieved by means of a target and a method as defined in the appended independent claim. Other embodiments are defined by the dependent claims.

According to a first aspect of the present disclosure, a target for use in surveying applications is provided. The target comprises a plurality of light sources arranged around a longitudinal axis of a base element of said target and configured to emit light radially. The target further comprises a control unit. The control unit is configured to receive, from a surveying instrument aimed towards the target, an input indicative of a distance between the target and the surveying instrument. The control unit is further configured to control an intensity of the light emitted by the plurality of light sources based on the input indicative of the distance between the target and the surveying instrument.

The light sources may for example include light-emitting diodes (LEDs). The light sources may for example be arranged symmetrically around the longitudinal axis of the base element. The light sources may be arranged in one or more rows around the base element. The longitudinal axis may be an axis of the target which, during operation of the target, is in a substantially vertical direction. During operation, the light sources may, in some embodiments, be arranged to emit light substantially horizontally.

The surveying instrument may comprise a light detector configured to detect light emitted by the light sources, for example for identifying and/or tracking the target. The surveying instrument may for example be a total station, a geodetic scanner or any instrument combining the functions of a total station and a scanner, in particular a surveying instrument having a function for tracking of a target.

The intensity of light received (or detected) at a surveying instrument from a light source decreases as the distance between the surveying instrument and the light source increases. Therefore, when the target (i.e., the light source) is placed at a shorter distance from the surveying instrument, the light sources may emit light with a lower intensity without affecting the interaction between the target and the surveying instrument, while at longer distances, the light sources may emit light with a higher intensity in order for a sufficient light intensity to reach the surveying instrument.

Hence, with the present embodiments, the intensity of the light emitted by the light sources may be controlled based on a distance between the target and the surveying instrument, thereby resulting in a more energy efficient way of operating the target.

Often the position of the target is tracked over time, for example as an operator walks around with the target. The target may also be mounted on a vehicle, such as a rover, or on another object which position is of interest. The present embodiments may provide that the intensity of light emitted by the light sources of the target is adapted based on the distance to the surveying instrument, for example as the target is moved during operation.

According to some embodiments, the input indicative of a distance between the target and the surveying instrument may comprise a position of the surveying instrument. The control unit may further be configured to determine a position of the target from a target position input received from an external source. The control unit may further be configured to determine the distance between the surveying instrument and the target based on the received position of the surveying instrument and the determined position of the target. The control unit may further be configured to control the intensity of the light emitted by the plurality of light sources based on the determined distance.

According to some embodiments, the target may further comprise a global navigation satellite system (GNSS) receiver. The target position input received from an external source may comprise a target position input received via said GNSS receiver.

The external sender may be a global navigation satellite system in communication with the GNSS receiver.

According to some embodiments, the target may further comprise input means. The target position input received from an external source may comprise a target position input received via said input means.

For example, the target position may be input by an operator of the target. The target may be positioned at a marked point having known position coordinates. The operator may input the known position coordinates to the target using the input means.

According to some embodiments, the input indicative of a distance between the target and the surveying instrument may comprise a measured distance between the target and the surveying instrument.

For example, the surveying instrument may comprise sensors for measuring a distance, such as an electronic distance measurement (EDM) device.

According to some embodiments, the input indicative of a distance between the target and the surveying instrument may comprise a measured optical signal strength of light emitted by the plurality of light sources and detected by a light detector of the surveying instrument. The control unit may be configured to control the intensity of the light emitted by the plurality of light sources based on a difference between the measured optical signal strength and an optical signal strength model.

As mentioned above, the intensity of light emitted by a light source that is received (or detected) at a surveying instrument (or a particular location) decreases as the distance between the surveying instrument (or the particular location) and the light source increases. Specifically, the intensity of the received or detected light may be proportional to $1/d^2$, wherein d is the distance from the light source. A signal strength of light (or intensity of light) emitted by the plurality of light sources and detected by a light detector of the surveying instrument may therefore be indicative of a distance between the target and the surveying instrument.

Further, in embodiments in which the input indicative of a distance between the target and the surveying instrument comprises, or is related to, an optical signal strength (or intensity) measured at the surveying instrument, the measured optical signal strength may be fed back to the control unit. Therefore, a feedback regulation loop may be provided for the light intensity. The control unit may compare the received input with a model or a setpoint value for the intensity. Based on the comparison, the control unit may control the light sources to increase or decrease the intensity. For example, if the light intensity detected at the surveying instrument is higher than a reference value, the control unit may control the light sources to decrease the intensity. On the other hand, if the light intensity detected at the surveying instrument is lower than a reference value (which may be different or the same reference value), the control unit may control the light sources to increase the intensity.

Including a measurement of the detected light intensity (or optical signal strength) in the light control, may further allow for compensation of other factors which may affect the light intensity, such as snow, rain, or fog.

According to some embodiments, the input indicative of a distance between the target and the surveying instrument may comprise a wireless communication between the surveying instrument and the target. The control unit may be configured to control the intensity of the light emitted by the plurality of light sources based on a signal strength of the wireless communication.

Similarly to light emitted by the light sources, the intensity of wireless signals that is detected at a particular location also decreases as the distance from the place where the wireless signals were emitted to this particular location increases. If the wireless signal output strength is known, a measured signal strength may be indicative of a distance to the source. Further, if the wireless signal output strength is not known, a change in measured signal strength due to a change in position may be indicative of how the distance from the source changed due to the change in position. Therefore, the input indicative of the distance may comprise a wireless communication between the surveying instrument and the target. Specifically, the distance may be indicated by the signal strength of the wireless communication.

It will be appreciated that different types of inputs indicative of a distance between the target and the surveying instrument may be combined to increase an accuracy of a distance estimate or to provide an improved control of the light sources.

According to some embodiments, the control unit may further be configured to receive, from the surveying instrument, an indication that the surveying instrument is not aimed towards the target. Upon reception of such an indication, the control unit may be further configured to control the intensity of the light emitted by the plurality of light sources to be at a maximum level.

The surveying instrument may identify and track the target based on light emitted by the target. During tracking, the surveying instrument may lock onto the target, to follow the target during movement. An indication that the surveying instrument is not aimed towards the target may be based on a light detector at the surveying instrument not detecting light emitted by the light sources of the target, which may result in the target lock between the target and the surveying instrument being lost. The light detector of the surveying instrument may have a field of view. If the surveying instrument is not aimed at the target, the target may not be in the field of view, and the light detector main not be able to detect the target. Thus, if the surveying instrument is not aimed toward the target, the surveying instrument may search for the target by changing an orientation of the instrument until the detector detects the target signal. If the target lock between the target and the surveying instrument is lost, the control unit may control the intensity of the light emitted by the plurality of light sources to be at a maximum level in order to facilitate re-establishing the target lock.

According to a second aspect of the present disclosure, a surveying system is provided. The surveying system may comprise a target in accordance with the first aspect of the present disclosure and a surveying instrument. The surveying instrument may comprise a light detector configured to detect light emitted by the plurality of light sources of the target. The surveying instrument may further comprise an instrument sensor unit. The surveying instrument may further comprise an instrument control unit. The instrument control unit may be configured to determine the input indicative of the distance between the target and the surveying instrument, based on measurements received from the instrument sensor unit. The instrument control unit may further be configured to transmit, to the target, the input indicative of the distance between the target and the surveying instrument.

The surveying instrument may for example be a total station, a geodetic scanner or any instrument combining the functions of a total station and a scanner, in particular a surveying instrument having a function for tracking of a target.

According to some embodiments, the instrument sensor unit may comprise a position sensor. The instrument control unit may further be configured to determine a position of the surveying instrument, based on measurements of the position sensor. The instrument control unit may further be configured to transmit the determined position to the target.

For example, the position sensor may be a GNSS receiver.

For example, the instrument control unit may be configured to transmit the determined position to the target as the input indicative of the distance between the target and the surveying instrument.

According to some embodiments, the instrument sensor unit may comprise an electronic distance measurement, EDM, device. The instrument control unit may further be configured to transmit a distance between the target and the surveying instrument, measured using said EDM device, to the target.

According to some embodiments, the instrument control unit may further be configured to determine a measured optical signal strength of light emitted by the plurality of light sources and detected by the light detector. The instrument control unit may further be configured to transmit the measured optical signal strength to the target.

According to some embodiments, the instrument control unit may further be configured to determine, based on an input from the light detector, whether the surveying instrument is aimed towards the target. Upon a determination that the surveying instrument is not aimed towards the target, the instrument control unit may further be configured to transmit, to the target, an indication that the surveying instrument is not aimed towards the target.

As mentioned above, the target control unit may be configured to control the light sources to emit light at a maximum intensity level, upon reception of such an indication.

According to a third aspect of the present disclosure, a method for operating a target for use in surveying applications is provided. The target comprises a plurality of light sources arranged around a longitudinal axis of a base element of the target and configured to emit light radially. The method comprises receiving, from a surveying instrument aimed towards the target, an input indicative of a distance between the target and the surveying instrument. The method further comprises controlling an intensity of the light emitted by the plurality of light sources based on the input indicative of the distance between the target and the surveying instrument.

According to some embodiments, the input indicative of a distance between the target and the surveying instrument may comprise a position of the surveying instrument. The method may further comprise determining, from a target position input received from an external source, a position of the target. The method may further comprise determining the distance between the surveying instrument and the target based on the received position of the surveying instrument and the determined position of the target. The method may further comprise controlling the intensity of the light emitted by the plurality of light sources based on the determined distance.

According to some embodiments, the method may further comprise receiving the target position input from a global navigation satellite system, GNSS, receiver of the target.

According to some embodiments, the method may further comprise receiving the target position input via input means of the target.

According to some embodiments, the input indicative of a distance between the target and the surveying instrument may comprise a measured optical signal strength of light emitted by said plurality of light sources and detected by a light detector of said surveying instrument. The method may further comprise controlling the intensity of the light emitted by the plurality of light sources based on a difference between the measured optical signal strength and an optical signal strength model.

According to some embodiments, the input indicative of a distance between the target and the surveying instrument may comprise a wireless communication between the surveying instrument and the target. The method may further comprise determining the distance between the surveying instrument and the target based on a signal strength of the wireless communication.

According to some embodiments, the method may further comprise receiving, from the surveying instrument, an indication that the surveying instrument is not aimed towards the target. Upon reception of said indication, the method may further comprise controlling the intensity of the light emitted by the plurality of light sources to be at a maximum level.

It is noted that other embodiments using all possible combinations of features recited in the above-described embodiments may be envisaged. Thus, the present disclosure also relates to all possible combinations of features mentioned herein. Further, advantages and explanations of features provided in more detail with reference to one of the aspects of the present disclosure apply mutatis mutandis to corresponding features of the other aspects of the disclosure. Unnecessary repetitions have been avoided for legibility and brevity of the disclosure.

BRIEF DESCRIPTION OF DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figures 1, 2:
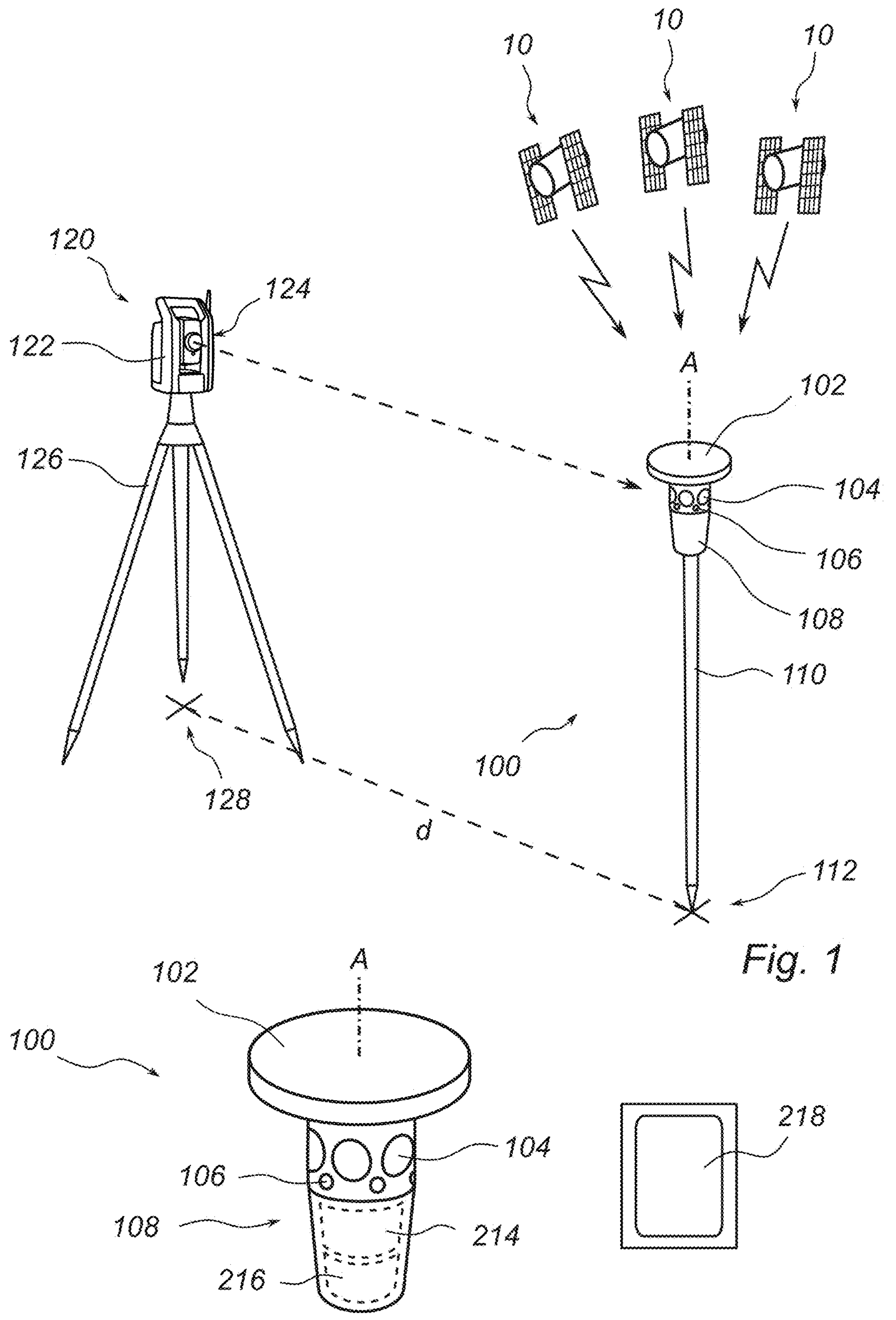
FIG. 1 illustrates a surveying system including a target and a surveying instrument, in accordance with some embodiments.
FIG. 2 illustrates a target, in accordance with some embodiments.
Figure 3:
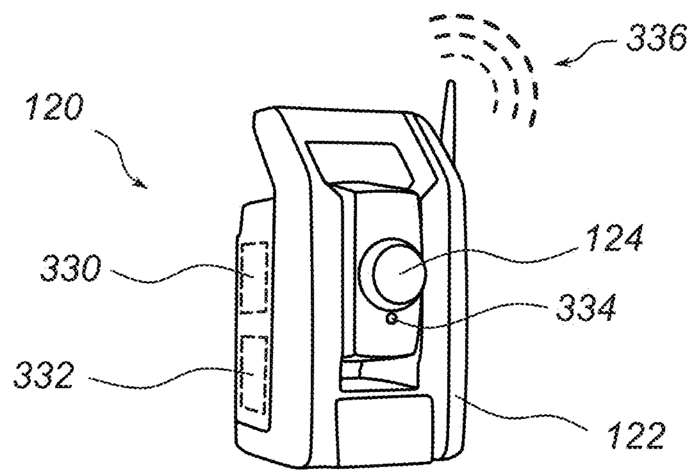
FIG. 3 illustrates a surveying instrument, in accordance with some embodiments.

With reference to FIGS. 1, 2 and 3 a surveying system, a target, and a surveying instrument, in accordance with some embodiments, will be described.

FIG. 1 illustrates a surveying system in a typical operation setup. The surveying system comprises a target 100 and a surveying instrument 120. FIG. 2 illustrates the target 100 in further detail. FIG. 3 illustrates the surveying instrument 120 in further detail.

The target 100 includes a base element 108 having a longitudinal axis A. During operation, the target 100 may be arranged such that the longitudinal axis A is upright, or substantially vertical, or tilted by e.g. 10 or 45 deg. For this purpose, the target may be equipped with a tilt sensor (not shown) in order to position (or for the surveyor/operator to hold) the target with the axis A along a vertical direction (i.e.

the local gravity direction) or in order to determine a tilt angle between the axis A and the vertical direction.

As is shown more clearly in FIG. 2, the target 100 comprises a plurality of light sources 106 arranged around the longitudinal axis A of the base element 108. Further, the target 100 comprises a plurality of reflective elements 104, also arranged around the longitudinal axis A of the base element 108. The plurality of reflective elements 104 are provided to reflect incident light. In FIGS. 1 and 2 the light sources 106 are shown as arranged below the reflective elements 104 and interleaved with the reflective elements 104. However, it will be appreciated that other arrangements of the light sources 106 and the reflective elements 104 are possible. For example, the light sources 106 may be arranged in more than one row (or ring) around the longitudinal axis A, the light sources 106 may be arranged above the reflective elements 104, at least some of the light sources 106 may be aligned with at least some of the reflective elements 104, etc.

The target 100 further comprises a control unit 214, configured to control a light output of the plurality of light sources 106, and a sensor unit 216 in communication with the control unit 214.

In FIG. 1, the target 100 is arranged on a pole 110 having a pointing tip, which may be placed on a measurement point 112 of interest. It will be appreciated that, in other embodiments, the target 100 may not be arranged on a pole 110. Instead, the target 100 may, for example, be arranged on a vehicle, such as a rover.

The target 100 further comprises an (optional) global navigation satellite system (GNSS) receiver 102. The GNSS receiver/antenna 102 may receive position data from a GNSS, illustrated by a plurality of satellites 10.

The target 100 further comprises (optional) input means in the form of a hand-held operator device 218, such as a tablet. The target 100 may alternatively include a display, touch screen, a keyboard or other input means. A target operator may provide input to the target 100, such as to the target controller 214, via the input means. For example, a target operator may provide a position input, indicating the target position 112, to the target 100 using the input means 218.

In FIG. 1, the surveying instrument 120 is arranged on a tripod 126, such that the surveying instrument is positioned above a point of reference 128. The point of reference 128 may have a known position.

As is shown more clearly in FIG. 3, the surveying instrument 120 includes a main element 122, including a light detector 124. The main element 122 further comprises an instrument control unit 330 and an instrument sensor unit 332. The surveying instrument 102 may be in wireless communication 336 with the target 100. The main element 122 may for example be the center unit of a total station (the center unit being rotatably mounted on an alidade for rotation about a first axis, the alidade being itself rotatably mounted on a base of the total station for rotation about a second axis orthogonal to the first axis) or the scanning head of a geodetic scanner.

In a common surveying operation, the surveying instrument 120 may be configured to determine a position of the point of interest 112 in relation to the point of reference 128. For example, the surveying instrument 120 may include an electronic distance measurement (EDM) device 334. The EDM device 334 may be configured to measure a distance d between the target 100 and the surveying instrument 120. For example, the EDM device 334 may be configured to measure the distance d based on a light beam emitted towards the target 100 and reflected back, at one of the reflective elements 104, towards the surveying instrument 120.

During operation, the surveying instrument 120 is aimed at the target 100. The plurality of light sources 106 are arranged to emit light radially, i.e., in directions away from the longitudinal axis A. The light detector 124 of the surveying instrument 120 is configured to detect light emitted by the plurality of light sources 106. The instrument control unit 330 may determine whether the instrument 120 is aimed at the target 100 based on an input from the light detector 124. The light detector 124 may be configured to provide said input if light emitted by the plurality of light sources 106 is detected.

Figure 4:
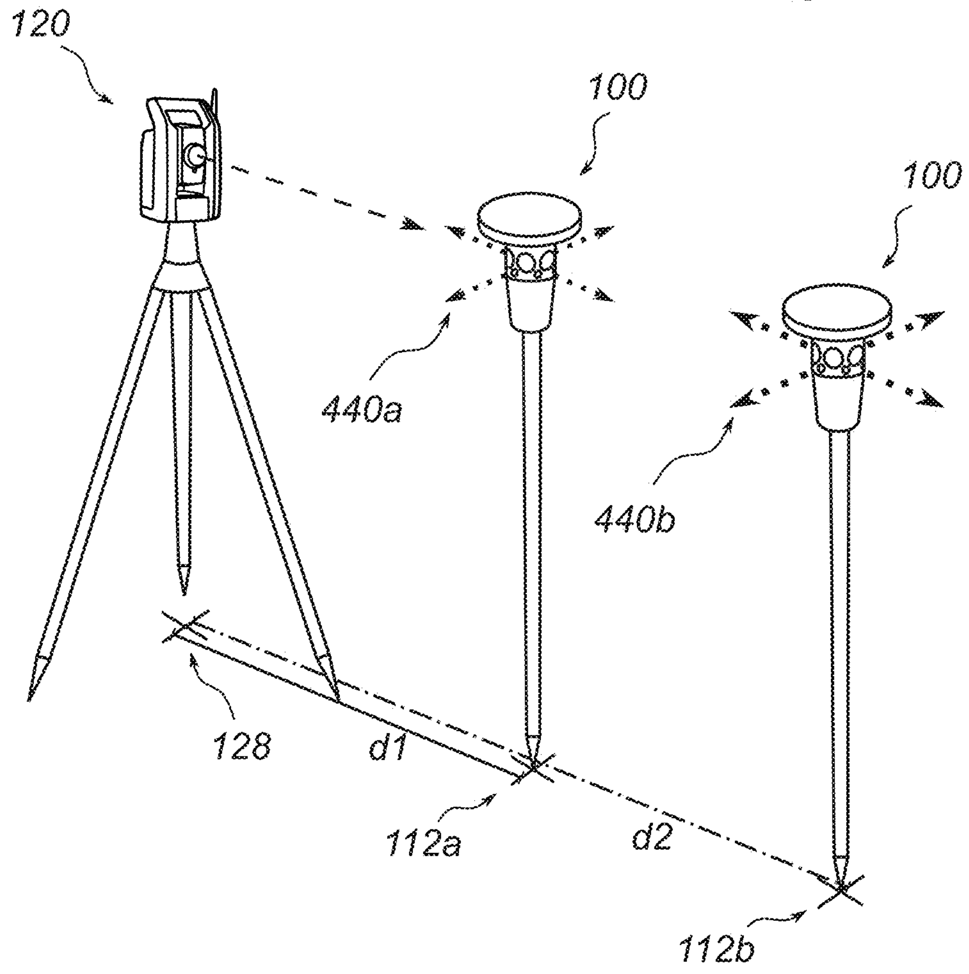
FIG. 4 illustrates a surveying system including a target and a surveying instrument, in accordance with some embodiments.

With further reference to FIG. 4, as well as FIGS. 1 to 3, details of the operation of the target and the surveying instrument will be provided. The details will be provided as operational tasks performed by the surveying instrument 120 and the target 100, or specifically by their control units 214, 330. It will be appreciated that the operational tasks may be expressed as steps of a method.

FIG. 4 illustrates a surveying system, similar to that shown in FIG. 1, except that it illustrates the target 100 in two positions 112*a*, 112*b*. In the first position 112*a*, the target 100 is arranged at a first distance d1 from the surveying instrument 120, and, in the second position 112*b*, the target 100 is arranged at a second distance d2 from the surveying instrument 120.

As the detectable light intensity from a light source decreases with distance from the light source, the intensity of the light emitted by the light sources 106 of the target 100 may be adapted based on the distance d between the target 100 and the surveying instrument 120. Therefore, at the first position 112*a*, at a first distance d1 from the surveying instrument, the target 100*a* may emit light 440*a* with a first intensity. At the second position 112*b*, at a second distance d2 from the surveying instrument, wherein the second distance d2 is larger than the first distance d1, the target 100 may emit light 440*b* with a second intensity. The second intensity may be higher than the first intensity in order to maintain a certain level of detection at the surveying instrument 120. As the intensity may be adapted based on the distance d, the overall power consumption of the target 100 may be optimized.

In some embodiments, the intensity of the light emitted by the light sources may be defined at certain levels for different distance intervals/ranges. For example, the first distance d1 in FIG. 4, may be in a first interval for which the light intensity 440*a* is set at a first level. The second distance d2 may be in a second interval for which the light intensity 440*b* is set at a second level. In such embodiments, a power consumption due to the light control may be limited.

For example, in a first range, at e.g., 0 to 200 m, the intensity may be set at a first level. In a second range, at e.g., 150 to 400 m, the intensity may be set at a second level. The second level may be four times as high as the first level. There may be an overlap between the different ranges, such that the switching between the different power levels of the light sources has some hysteresis, to avoid frequent switching for measurements close to a transition point between ranges.

During operation, the surveying instrument 120 is aimed at the target 100. The instrument control unit 330 may determine an input indicative of the distance d between the target 100 and the surveying instrument 120, based on measurements received from the instrument sensor unit 332.

The input indicative of the distance d may comprise a position 128 of the surveying instrument 120. The instrument control unit 330 may determine the position 120 based on measurements received from a position sensor in the instrument sensor unit 332.

The input indicative of the distance d may comprise a measured distance between the target 100 and the surveying instrument 120. The instrument sensor unit 332 may comprise an electronic distance measurement (EDM) device 334. The distance between the target 100 and the surveying instrument 120 may be measured by the surveying instrument 120 using the EDM 334.

The input indicative of the distance d may comprise a measured optical signal strength of light 440*a*, 440*b* emitted by the plurality of light sources 106 and detected by the light detector 124 of the surveying instrument 120.

The instrument control unit 330 may transmit the input indicative of the distance d between the target 100 and the surveying instrument 120 to the target 100.

The instrument control unit 330 may communicate with the target 100 using wireless communication 336.

The target control unit 214 may receive the input indicative of the distance d between the target 100 and the surveying instrument 120, from the surveying instrument 120.

The target control unit 214 may control an intensity of the light emitted by the plurality of light sources 106 based on the input indicative of the distance d between the target 100 and the surveying instrument 120.

As mentioned above, the input indicative of the distance d between the target 100 and the surveying instrument 120 may comprise a position 128 of the surveying instrument 120. The target control unit 214 may receive a target position input from an external source. The external source may be a GNSS 10, wherein the target position input may be received via the GNSS receiver 102. The external source may be the surveying instrument 120. Alternatively, or additionally, the external source may be a user or operator of the target 100, and the target position input may be received via the input means 218. The target control unit 214 may determine a position 112 of the target 100 based on the received position input. Based on the target position 112 and the position 128 of the surveying instrument 120, the control unit 214 may determine the distance d between the surveying instrument and the target. The control unit 214 may control the intensity of the light emitted by the plurality of light sources 106 based on the determined distance d.

Further, the input indicative of the distance d between the target 100 and the surveying instrument 120, may comprise a signal strength of a wireless communication 336 between the surveying instrument 120 and the target. The target control unit 214 may control the intensity of the light emitted by the plurality of light sources 106 based on the signal strength of the wireless communication.

The input indicative of the distance d between the target 100 and the surveying instrument 120 may comprise a measured optical signal strength of light emitted by the plurality of light sources 106 and detected by the light detector 124 of the surveying instrument 120. The target control unit 214 may control the intensity of the light emitted by the plurality of light sources based on a difference between the measured optical signal strength and an optical signal strength model or set point.

The instrument control unit 330 may further determine, based on an input from the light detector 124, whether the surveying instrument 120 is aimed towards the target 100. For example, if light emitted by the plurality of light sources 106 is received at the light detector 124, the instrument control unit 330 may determine that the surveying instrument 120 is aimed at the target. If it is determined that the surveying instrument 120 is not aimed at the target, for example if light emitted by the plurality of light sources 106 is not received at the light detector 124, the instrument control unit 330 may transmit to the target an indication that the surveying instrument 120 is not aimed towards the target 100.

Upon reception of an indication that the surveying instrument 120 is not aimed towards the target 100, the target control unit 214 may control the intensity of the light emitted by the plurality of light sources 106 to be at a maximum level.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A target for use in surveying applications, the target comprising:

a plurality of light sources arranged around a longitudinal axis (A) of a base element of said target and configured to emit light radially; and a control unit configured to:

receive, from a surveying instrument aimed towards the target, an input indicative of a distance (d) between the target and the surveying instrument, the input comprising a position of the surveying instrument;

determine, from a target position input received from an external source, a position of the target;

determine the distance between the surveying instrument and the target based on the received position of the surveying instrument and the determined position of the target; and control an intensity of the light emitted by the plurality of light sources based on the determined distance.

2. The target of claim 1, further comprising a global navigation satellite system, GNSS, receiver; wherein said target position input received from an external source comprises a target position input received via said GNSS receiver.

3. The target of claim 1, further comprising input means, wherein said target position input received from an external source comprises a target position input received via said input means.

4. The target of claim 1, wherein said input indicative of a distance between the target and the surveying instrument comprises a measured distance between the target and the surveying instrument.

5. A target for use in surveying applications, the target comprising:

a plurality of light sources arranged around a longitudinal axis (A) of a base element of said target and configured to emit light radially; and a control unit configured to:

receive, from a surveying instrument aimed towards the target, an input indicative of a distance (d) between the target and the surveying instrument, wherein said input indicative of a distance between the target and the surveying instrument comprises a measured optical signal strength of light emitted by said plurality of light sources and detected by a light detector of said surveying instrument; and control an intensity of the light emitted by the plurality of light sources based on a difference between the measured optical signal strength and an optical signal strength model.

6. A target for use in surveying applications, the target comprising:

a plurality of light sources arranged around a longitudinal axis (A) of a base element of said target and configured to emit light radially; and a control unit configured to:

receive, from a surveying instrument aimed towards the target, an input indicative of a distance (d) between the target and the surveying instrument, wherein said input indicative of a distance between the target and the surveying instrument comprises a wireless communication between the surveying instrument and the target; and control an intensity of the light emitted by the plurality of light sources based on a signal strength of the wireless communication.

7. A target for use in surveying applications, the target comprising:

a plurality of light sources arranged around a longitudinal axis (A) of a base element of said target and configured to emit light radially; and a control unit configured to:

receive, from a surveying instrument aimed towards the target, an input indicative of a distance (d) between the target and the surveying instrument;

control an intensity of the light emitted by the plurality of light sources based on the input indicative of the distance between the target and the surveying instrument;

receive, from the surveying instrument, an indication that the surveying instrument is not aimed towards the target; and upon reception of said indication, control the intensity of the light emitted by the plurality of light sources to be at a maximum level.

8. A surveying system comprising the target of claim 1, and a surveying instrument comprising:

a light detector configured to detect light emitted by the plurality of light sources of the target;

an instrument sensor unit; and an instrument control unit configured to:

determine the input indicative of the distance between the target and the surveying instrument, based on measurements received from the instrument sensor unit; and transmit the input indicative of the distance between the target and the surveying instrument to the target.

9. The surveying system of claim 8, wherein:

said instrument sensor unit comprises a position sensor; and the instrument control unit is configured to:

determine a position of the surveying instrument, based on measurements of the position sensor; and transmit the determined position to the target.

10. The surveying system of any of claim 8, wherein:

said instrument sensor unit comprises an electronic distance measurement, EDM, device; and said instrument control unit is further configured to transmit a distance between the target and the surveying instrument, measured using said EDM device, to the target.

11. The surveying system of claim 8, wherein said instrument control unit is further configured to:

determine a measured optical signal strength of light emitted by the plurality of light sources and detected by the light detector; and transmit the measured optical signal strength to the target.

12. The surveying system of claim 8, wherein said instrument control unit is further configured to:

determine, based on an input from the light detector, whether the surveying instrument is aimed towards the target; and upon a determination that the surveying instrument is not aimed towards the target, transmit, to the target, an indication that the surveying instrument is not aimed towards the target.

13. A method for operating a target for use in surveying applications, the target comprising a plurality of light sources arranged around a longitudinal axis of a base element of said target and configured to emit light radially, the method comprising:

receiving, from a surveying instrument aimed towards the target, an input indicative of a distance between the target and the surveying instrument;

controlling an intensity of the light emitted by the plurality of light sources based on the input indicative of the distance between the target and the surveying instrument;

receiving, from the surveying instrument, an indication that the surveying instrument is not aimed towards the target; and upon reception of said indication, controlling the intensity of the light emitted by the plurality of light sources to be at a maximum level.

* * * * *